US008222788B2

(12) United States Patent
Rose

(10) Patent No.: US 8,222,788 B2
(45) Date of Patent: Jul. 17, 2012

(54) ELECTRIC MACHINE

(75) Inventor: J. Scott Rose, Alton, IL (US)

(73) Assignee: Emerson Electric Co., St. Louis, MO (US)

( * ) Notice: Subject to any disclaimer, the term of this patent is extended or adjusted under 35 U.S.C. 154(b) by 64 days.

(21) Appl. No.: 12/551,966

(22) Filed: Sep. 1, 2009

(65) Prior Publication Data
US 2011/0050024 A1    Mar. 3, 2011

(51) Int. Cl.
H02K 3/02    (2006.01)
(52) U.S. Cl. ...................................................... 310/195
(58) Field of Classification Search .................. 310/180, 310/184, 185, 216.004, 195; 418/55.6, 151; 417/312, 313, 371, 423.7, 44.1, 53
See application file for complete search history.

(56) References Cited

U.S. PATENT DOCUMENTS

| | | | |
|---|---|---|---|
| 3,324,371 A | 6/1967 | Stauffer | |
| 3,348,183 A | 10/1967 | Hodges et al. | |
| 3,450,338 A | 6/1969 | Huttenlocher | |
| 3,488,569 A | 1/1970 | Allendorph et al. | |
| 3,515,919 A | 6/1970 | Houtman | |
| 3,528,171 A | 9/1970 | Houtman | |
| 3,942,055 A | 3/1976 | Hoffmeyer | |
| 4,035,910 A | 7/1977 | Kindig | |
| 4,100,444 A | 7/1978 | Boyd, Jr. | |
| 4,107,583 A | 8/1978 | Houtman | |
| 4,702,681 A * | 10/1987 | Inaba et al. | 418/55.6 |
| 4,880,391 A | 11/1989 | Hurtgen | |
| 5,319,844 A | 6/1994 | Huang et al. | |
| 5,753,989 A | 5/1998 | Syverson et al. | |
| 6,114,790 A | 9/2000 | Fei | |
| 6,257,840 B1 | 7/2001 | Ignatiev et al. | |
| 6,349,558 B1 | 2/2002 | Ichikawa et al. | |
| 6,544,009 B2 * | 4/2003 | Makino et al. | 417/312 |
| 6,634,182 B2 | 10/2003 | Ichikawa et al. | |
| 6,708,520 B2 | 3/2004 | Yasunori et al. | |
| 6,984,909 B2 * | 1/2006 | Kadoya et al. | 310/185 |
| 7,082,786 B2 | 8/2006 | Yasunori et al. | |
| 2004/0056557 A1 | 3/2004 | Enomoto et al. | |
| 2004/0179959 A1* | 9/2004 | Hasegawa | 417/374 |
| 2005/0103074 A1 | 5/2005 | Kim et al. | |
| 2006/0163966 A1 | 7/2006 | Yang et al. | |
| 2007/0007843 A1 | 1/2007 | Matsubara | |
| 2008/0012438 A1 | 1/2008 | Hong | |
| 2008/0129131 A1 | 6/2008 | Shin et al. | |

FOREIGN PATENT DOCUMENTS

| | | |
|---|---|---|
| CN | 2031175 UU | 1/1989 |
| CN | 1476151 A1 | 2/2004 |
| CN | 2650377 A1 | 10/2004 |
| EP | 1863148 A2 | 12/2007 |
| JP | 58189354 A1 | 11/1983 |
| JP | 2000-083339 | 3/2000 |
| JP | 200083339 A1 | 10/2000 |
| WO | 2008032942 A1 | 3/2008 |
| WO | 2008055408 A1 | 5/2008 |

* cited by examiner

Primary Examiner — Tran Nguyen
(74) Attorney, Agent, or Firm — Harness, Dickey & Pierce, P.L.C.

(57) ABSTRACT

A three-phase, high voltage motor for use in a scroll compressor includes a stator core having an annular rim and a plurality of teeth extending radially inward from the rim. Aluminum windings are wrapped around teeth of the plurality of teeth of the stator core. The windings are spaced 120 electrical degrees from each other. The motor further includes a rotor body that is rotatably mounted inside the stator core and includes an external surface facing the stator core.

8 Claims, 5 Drawing Sheets

ELECTRIC MACHINE

BACKGROUND OF THE INVENTION

The present invention relates to electric machines, such as motors or generators, and more particularly to a three-phase electric machine having aluminum windings.

Electric machines, such as motors or generators, typically include a stator mounted inside a housing and a rotor supported in the housing to rotate relative to the stator. The stator and/or the rotor of the machines have windings comprising coils of wire. In motors, electricity is delivered through these coils to generate magnetic fields, causing the rotor to turn. In generators, the electricity is generated in the windings as the rotor turns. Although different electrically conductive materials may be used to make the windings, in the past these windings have frequently been made from copper or copper alloys.

Three-phase systems are used to power large motors and other large electrical loads. Three-phase electric motors are a common class of three-phase loads. Three-phase induction motors are often used to drive scroll compressors for their efficiency, cost effectiveness and durability. Scroll compressors are desirable in devices such as air conditioners for their efficiency in compressing gas refrigerant.

The size, performance and cost of the apparatus incorporating the electric machine may be important factors when making purchasing decisions, especially for air conditioners. Additionally, the size, performance and cost of the electric machine frequently has a significant impact on the size and cost of the overall apparatus.

Prices of conductive materials used to make windings fluctuate. At times, some winding materials are more expensive than others. For example, sometimes copper is very expensive relative to other electrically conductive materials such as aluminum. Electrical conductivity of the material is also an important consideration. As conductivity decreases, larger windings must be used to overcome losses. However, larger windings raise concerns about machine size and resulting apparatus size. Thus, even though some materials such as aluminum can have a cost advantage over more frequently used materials such as copper, copper may still be used due to these other concerns such as size. Conventionally, modifying a motor designed to use copper windings so it had aluminum windings but maintained similar performance characteristics required a motor having a greater volume. This volume increase was often accomplished by substantially increasing the diameter and/or the length of the motor to accommodate increased aluminum winding volume over the conventional copper winding volume. But if the exterior size of the motor is restricted by the application in which the motor is to be used, these increases in length and/or diameter may not work, so the alternative winding material (e.g., aluminum) cannot be used without sacrificing performance. It would be advantageous if a three-phase electric machine could incorporate more cost effective materials (e.g., aluminum windings) but maintain similar performance characteristics in the motor without substantially increasing its diameter and/or length.

SUMMARY OF THE INVENTION

In one aspect, the present invention relates generally to a three-phase, high voltage motor for use in a scroll compressor. The motor comprises a stator core having an annular rim and a plurality of teeth extending radially inward from the rim. Aluminum windings are wrapped around teeth of the plurality of teeth of the stator core. The windings are spaced 120 electrical degrees from each other. The motor further comprises a rotor body that is rotatably mounted inside the stator core and includes an external surface facing the stator core.

In another aspect, the present invention relates generally to a scroll compressor system comprising a scroll compressor and a three-phase, high voltage motor. The motor comprises a stator core having an annular rim, an outer diameter, a root tooth diameter, an inner diameter and a plurality of teeth extending radially inward from the rim. Each tooth of said plurality of teeth has a root, a neck extending inward from the root, and a head opposite the root. The annular rim has an outer edge defining an enclosed cross-sectional area. Each adjacent pair of teeth defines a slot having an area. Aluminum windings are wrapped around teeth of said plurality of teeth of the stator core. The windings are spaced 120 electrical degrees from each other. The motor further comprises a rotor body that is rotatably mounted inside the stator core and includes an external surface facing said stator core.

In yet another aspect, the present invention relates generally to a method of modifying a three-phase, high voltage motor for use in a scroll compressor. The motor includes a stator core having a plurality of teeth. Each pair of adjacent teeth of said plurality defines a slot having a volume. Copper windings are wrapped around teeth of said plurality of teeth of the stator core. The windings are spaced 120 electrical degrees from each other. The motor further comprises a rotor that is rotatably mounted inside the stator core and includes an external surface facing said stator core. The method comprises replacing the copper windings with aluminum windings formed from wire having a gage size at least two gages larger than that forming the copper windings and a length equal to that forming the copper windings. The volume of the slots is increased to accommodate the aluminum windings.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
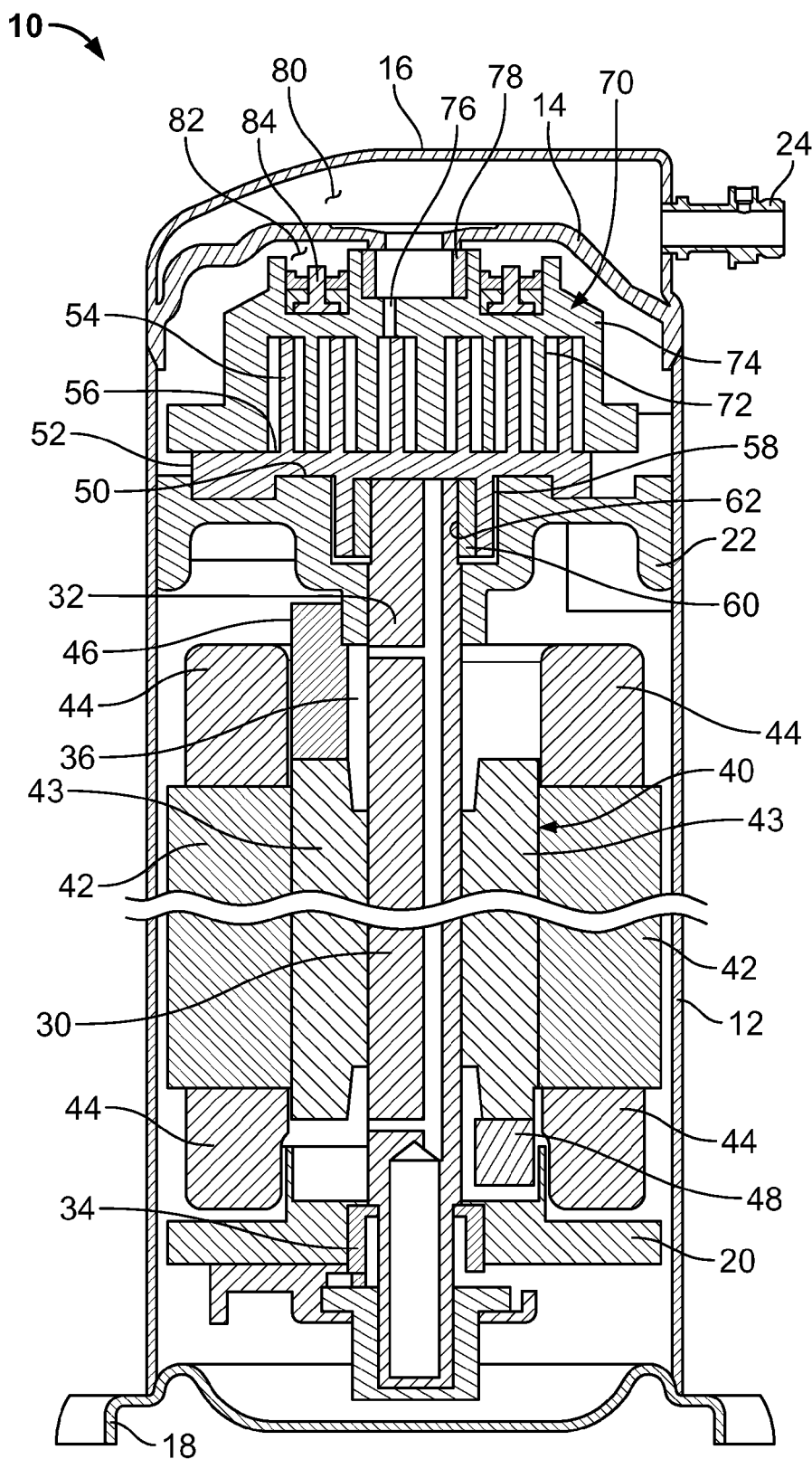
FIG. 1 is cross section of a scroll compressor incorporating a motor of the present invention.

Referring now to the drawings and in particular, FIG. 1, a scroll compressor, generally indicated by 10, comprises a generally cylindrical shell 12, a partition 14 connected to (e.g., welded) an upper end of the shell, a lid 16 connected to the partition and a base 18 connected to a lower end of the shell. A lower bearing housing 20 is secured to the shell 12 and an upper bearing housing 22 is secured to the shell above the lower bearing housing. The base 18 has a plurality of mounting feet (not shown) integrally formed with the base 18. The lid 16 is provided with a refrigerant discharge fitting 24.

A drive shaft 30 having an off-center crank pin 32 at its upper end is rotatably mounted in a first bearing 34 positioned in the lower bearing housing 20 and a second bearing 36 positioned in the upper bearing housing 22. The drive shaft 30 is rotated by an electric motor, generally designated by 40. In the illustrated embodiment, the motor is a three-phase, high voltage induction motor having a standard operating voltage level range between about 208V and about 575V.

Figure 2:
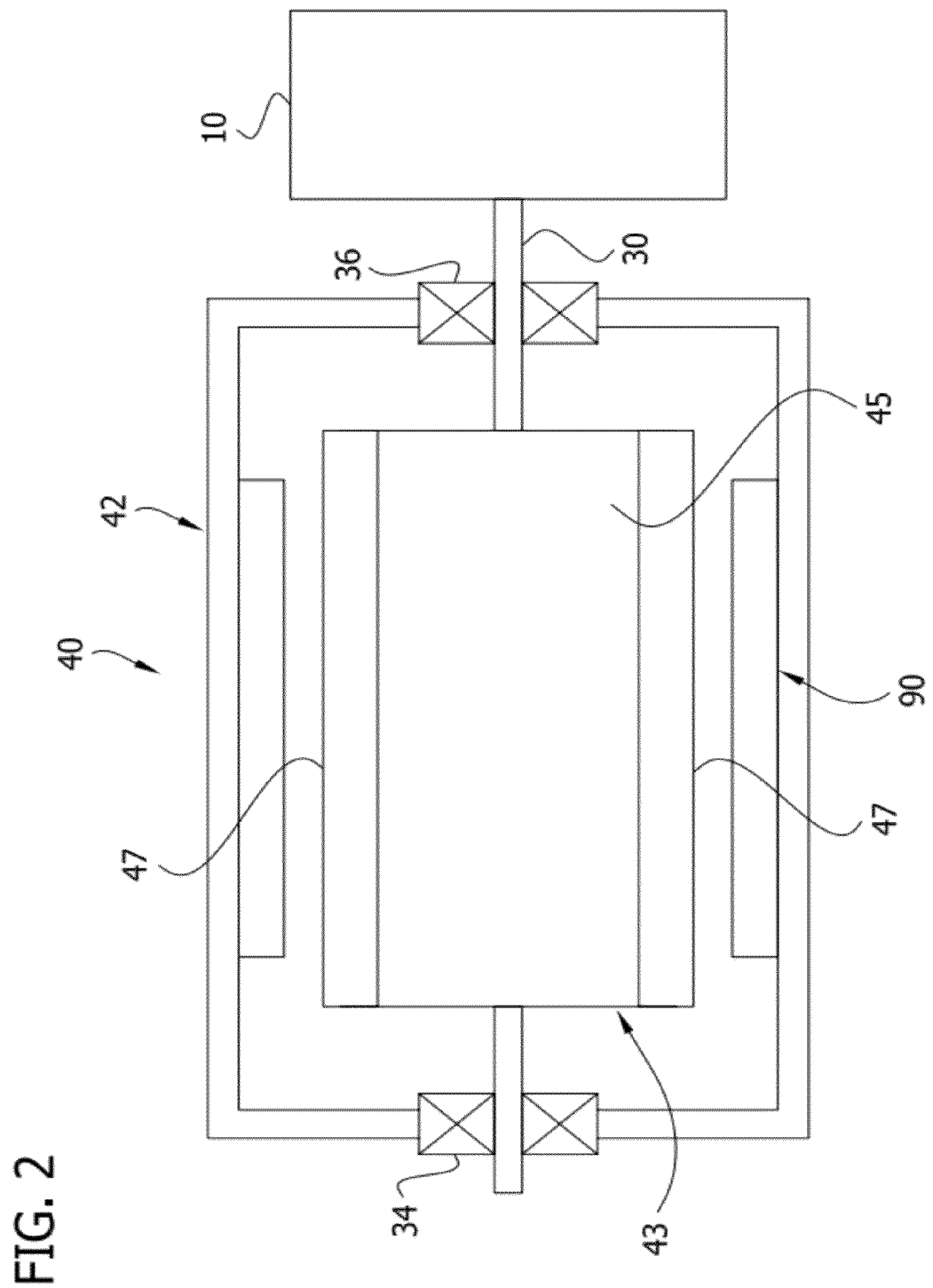
FIG. 2 is a schematic cross section of the scroll compressor driven by the motor of the present invention.

Referring to FIG. 2, the motor 40 includes a stator assembly 42, windings 44 (see FIG. 1) wound about the stator assembly and a rotor assembly 43 mounted (e.g., press fit) on the drive shaft 30. The rotor assembly 43 includes a rotor body 45 having induction rotor bars 47 and upper and lower counter weights 46, 48, respectively (see FIG. 1). In the illustrated embodiment, the rotor assembly 43 is a "squirrel-cage rotor." Because the features of the squirrel-cage rotor are generally well known in the art, they will not be explained in further detail. Rotors for three-phase systems will have variations in the depth and shape of the induction bars to accommodate the particular design needs.

As further shown in FIG. 1, the upper surface of the upper bearing housing 22 is provided with a flat thrust-bearing surface 50 on which an orbiting scroll member 52 is disposed. The scroll member 52 has a spiral vane or wrap 54 extending upward from an end plate 56. Projecting downward from the lower surface of the plate 56 of the orbiting scroll member 52 is a cylindrical hub having a journal bearing 58 therein. A drive bushing 60 is rotatably disposed in the bearing 58. The drive bushing 60 has an inner bore 62 which receives the crank pin 32. The crank pin has a flat on one surface that engages a flat surface (not shown) formed in a portion of bore 62 to provide a radially compliant driving arrangement.

Non-orbiting scroll member 70 is also provided with a wrap 72 extending downward from an end plate 74 positioned in meshing engagement with the wrap 54 of the orbiting scroll member 52. Non-orbiting scroll member 70 also has a centrally disposed discharge passage 76 that communicates with an upward-facing open recess 78 in fluid communication with a discharge muffler chamber 80 defined by the lid 16 and partition 14. An annular recess 82 in the non-orbiting scroll member 70 houses a floating seal assembly 84. The open recess 78, annular recess 82 and floating seal assembly 84 cooperate to define axial pressure chambers, which receive pressurized fluid being compressed by the wraps 54, 72 to exert an axial force on the non-orbiting scroll member 70 to urge tips of the wraps into sealing engagement with the end plates 56, 74. The interaction between the scroll members 52, 70 is broadly defined as a pump. The scroll compressor 10 as generally described above is well known by those skilled in the art and will not be described in further detail.

Figure 3:
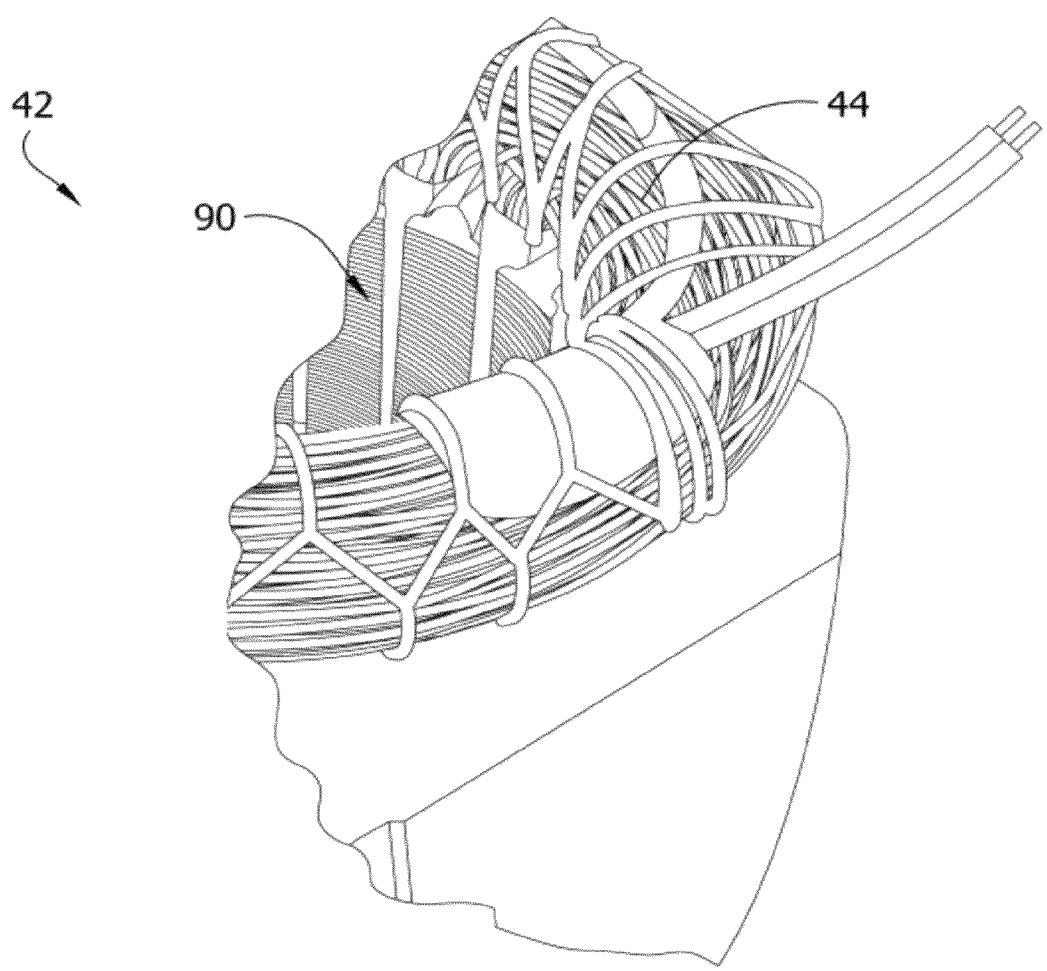
FIG. 3 is a fragmentary perspective of a stator assembly of the present invention.
Figure 4:
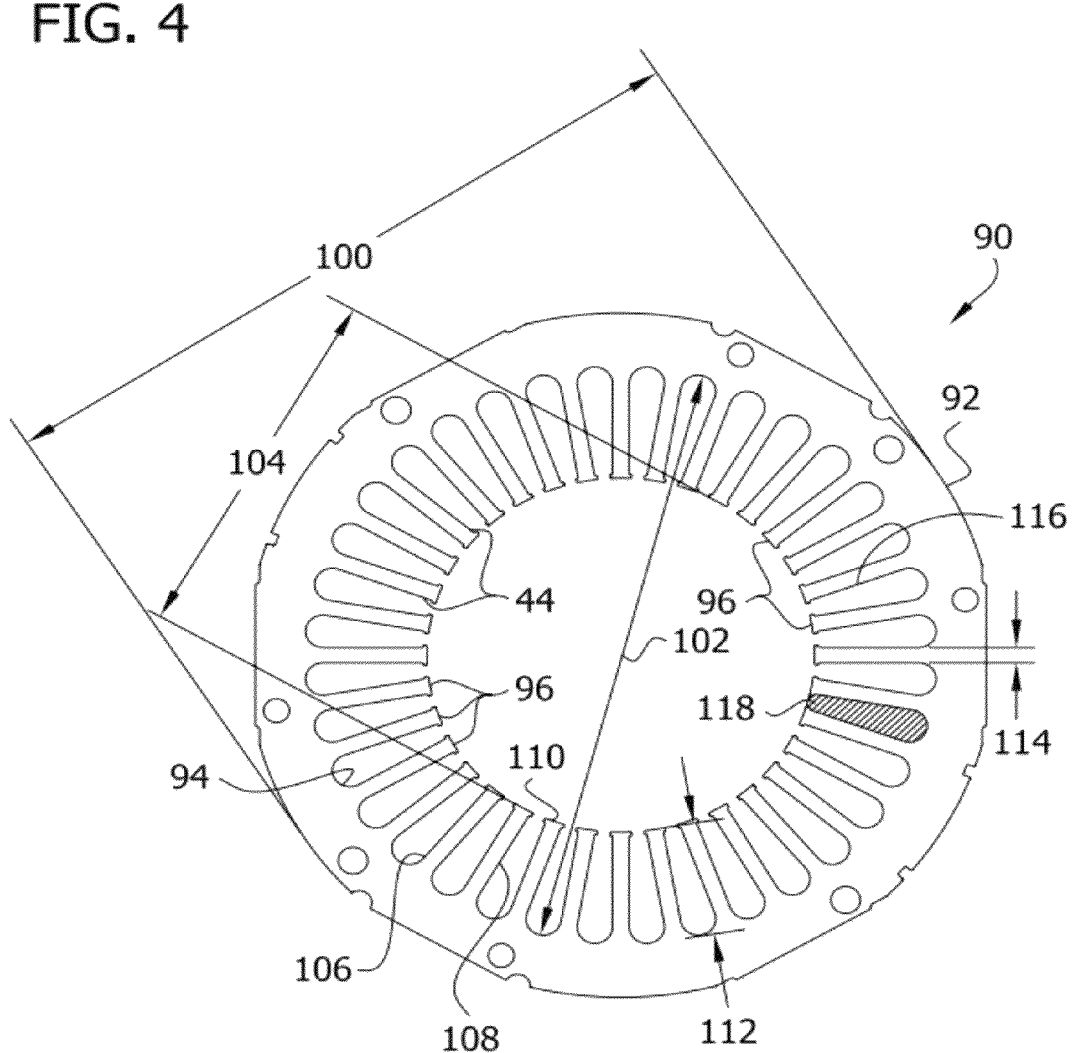
FIG. 4 is an end elevation of a stator lamination according to the present invention.

As illustrated in FIG. 3, the stator assembly 42 includes a laminated body or core, generally designated by 90, comprising stacked lamina or laminations 92. The lamina have a stack height H. A lamination 92 is shown in FIGS. 3 and 4. Although the laminations 92 may be made of other materials without departing from the scope of the present invention, in one embodiment the laminations are made from electrical grade steel alloy sheet or plate stock having a thickness in a range from about 0.014 inch to about 0.032 inch. As will be appreciated by those skilled in the art, different materials and stack thicknesses may be used depending upon motor design and performance requirements without departing from the scope of the present invention. As will be appreciated by those skilled in the art, the lamina may be formed in sections and stacked in a staggered configuration without departing from the scope of the present invention.

The stator core 90 has an annular rim 94 and a plurality of teeth 96 extending radially inward from the rim. As will be readily understood by one skilled in the art, the winding 44 is wrapped around groups of teeth 96 consisting of two, three, four or more teeth. This type of winding is conventionally known as concentric winding. Other winding schemes and techniques may be used without departing from the scope of embodiments of the present invention. For example, the stator assembly 42 may be series wound, parallel wound and multiple path parallel wound, as will be understood by those skilled in the art. The windings 44 are each made from a single strand of aluminum wire wound around groups of teeth a plurality of times. Traditionally, copper wire from about 15 American Wire Gauge (AWG) to about 22 AWG is used for the motor windings. In one embodiment of the present invention, the wire is 16 AWG, insulated, single strand, aluminum magnet wire. Other wire sizes from about 13 AWG to about 20 AWG may be used for aluminum wire without departing from the scope of the present invention. Although the wires may have other cross-sectional shapes without departing from the scope of the present invention, in one embodiment the wire has a round, and more particularly a circular, cross section. Depending upon the solidity factor required to obtain suitable slot density, other cross-sectional shapes may be used, such as rectangular or square. Electric current flows through the windings 44 generating a rotating magnetic field that interacts with the currents induced in the induction rotor bars 47 to drive the rotor assembly 43 so it rotates relative to the stator assembly 42. As will be appreciated by those skilled in the art, the stator core 90 has four, six or eight magnetic dipoles. In other words, the stator assembly 42 has windings 44 that are electrically energized to provide four, six or eight magnetic dipoles that rotate around the stator core 90.

Figure 5:
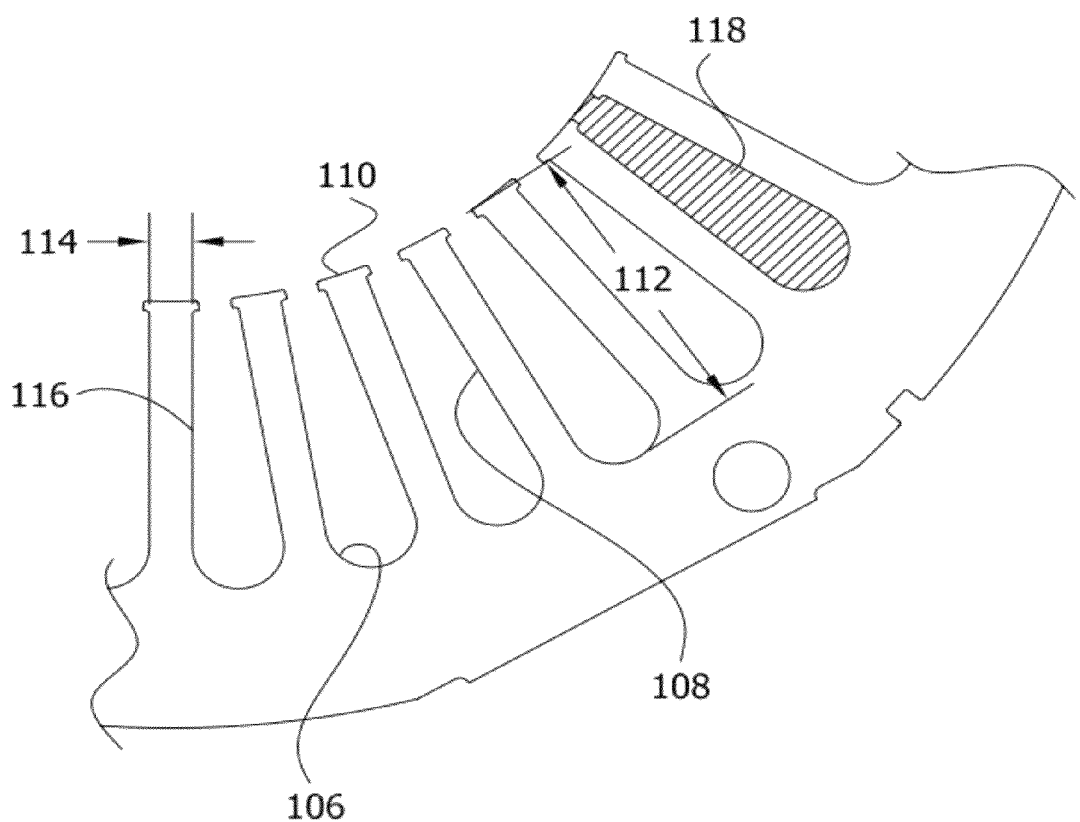
FIG. 5 is an enlarged end elevation of the stator lamination of the electric machine.

As shown in FIGS. 4 and 5, the stator core 90 (and each of the laminations 92 forming the stator core) has an outer diameter 100, a root tooth diameter 102 and an inner diameter 104. The stator core 90 may have a variety of dimensions without departing from the scope of the present invention. In some embodiments, the stator core 90 has a ratio of the stator core inner diameter 104 to the stator core outer diameter 100 that is less than conventional. Reduction of this ratio allows for a lower conductivity material, such as aluminum, to be used while maintaining performance as compared with a higher conductivity material, such as copper. Specifically, this ratio provides additional stator slot area for adding additional wire to the winding 44 within the stator core 90, as compared with a conventional stator core. The foregoing ratio also allows for use of a lower conductivity material while maintaining performance, as discussed above.

In addition, each tooth 96 has a root 106, a neck 108 extending inward from the root, a head 110 opposite the root, and a length 112 (or tooth length), measured from the root to the head. Each neck 108 has a width 114 (or tooth width), and each adjacent pair of teeth 96 define a slot 116 having an area 118. Each tooth has a ratio of tooth neck width 114 to tooth length 112 that is less than conventional. Lowering this ratio to less than conventional allows for a lower conductivity material, such as aluminum, to be used while maintaining performance as compared with a higher conductivity material, such as copper. Specifically, this ratio provides teeth having an elongate aspect ratio, providing additional space between teeth and along the length of the teeth for adding additional wire to the winding 44 within the stator core 90, as compared to a conventional stator core. The foregoing reduced ratio also allows for use of a lower conductivity material while maintaining performance, as discussed above.

Moreover, in some embodiments a ratio of a sum of the slot areas to the enclosed cross-sectional area of the motor 40 is larger than with a conventional three-phase motor. Increasing this ratio allows for a lower conductivity material, such as aluminum, to be used while maintaining performance, as compared with a higher conductivity material, such as copper. Specifically, increasing this ratio range provides more slot area as a portion of motor size for adding additional wire to the winding 44 within the stator core 90, as compared with a conventional stator core. The foregoing ratio also allows for use of a lower conductivity material while maintaining performance, as discussed above.

Exemplary slot and pole combinations defined by the stator core 90 include 18 slots 116 and 2, 4, or 6 poles, 24 slots and 2, 4, 6 or 8 poles, 30 slots and 2 poles, and 36 slots and 2, 4, 6 or 8 poles.

It may also be necessary to increase the stack height H to allow for use of the aluminum windings 44. In one embodiment, the stack height H is in a range from about 2¾ inches to about 6 inches. In further embodiments, the stack height H is in a range between about 3 inches and about 5½ inches. In still some further embodiments the stack height is about 5½ inches. This increased stack height provides additional lamina 92 for additional aluminum windings 44 to be wound, as compared to a traditional stack height of about 2½ to about 4½ inches.

A method may be used to change a three-phase motor designed for copper windings to have aluminum windings. The copper windings are replaced with aluminum windings. The replacement windings are made of aluminum wire having a wire gage at least two sizes larger than that of the copper windings. For example, if the copper windings had a wire gage of about 18 AWG, they are replaced with aluminum wire having a wire gage of about 16 AWG. The aluminum wire has a length about equal to that of the copper wire so that the windings may have a number of wraps about equal to the number of wraps the copper windings would have had. Because the aluminum wire gage is larger, the slot volumes must be increased to accommodate the lager wire. In some designs the slot volumes can be increased by increasing the slot areas measured lateral to the teeth. However, in some designs the material of the stator core becomes too small to carry the electrical flux required to efficiently drive the rotor. This condition is referred to as saturation. If saturation increases to an unacceptable degree, the slot volumes can be increased by increasing the slot height, such as by increasing the number of laminations. As will be appreciated by those skilled in the art, using this method can reduce material cost (e.g., by as much as 35 percent) without sacrificing motor efficiency.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A scroll compressor system comprising:
   a scroll compressor for compressing refrigerant; and
   a three-phase, high voltage motor having an operating voltage level range between about 208V and about 575V, the motor comprising:
   a stator core having an annular rim and a plurality of teeth extending radially inward from the rim;
   windings comprising aluminum wrapped around teeth of said plurality of teeth of the stator core; and
   a rotor body rotatably mounted inside the stator core including an external surface facing said stator core.

2. A scroll compressor system as set forth in claim 1 wherein the stator has a motor stack height in a range from about 2¾ inches to about 6 inches.

3. A scroll compressor system as set forth in claim 2 wherein the motor stack height is about 5½ inches.

4. A scroll compressor system as set forth in claim 1 wherein the windings comprise aluminum magnet wire.

5. A scroll compressor system as set forth in claim 1 wherein the windings comprise aluminum alloy magnet wire.

6. A scroll compressor system comprising:
   a scroll compressor for compressing refrigerant; and
   a three-phase, high voltage motor having an operating voltage level range between about 208V and about 575V, the motor comprising:
   a stator core having an annular rim, an outer diameter, a root tooth diameter, an inner diameter, a plurality of teeth extending radially inward from the rim, each tooth of said plurality of teeth having a root, a neck extending inward from the root, and a head opposite the root, the annular rim having an outer edge defining an enclosed cross-sectional area, each adjacent pair of teeth defining a slot having an area;
   windings comprising aluminum wrapped around teeth of said plurality of teeth of the stator core, the windings including a first winding, a second winding and a third winding; and
   a rotor body rotatably mounted inside the stator core including an external surface facing said stator core.

7. A scroll compressor system as set forth in claim 6 wherein the motor has a stack height in a range from about 2¾ inches to about 6 inches.

8. A scroll compressor system as set forth in claim 7 wherein the motor stack height is about 5½ inches.

* * * * *